United States Patent
Priyadarshi et al.

(10) Patent No.: US 10,896,041 B1
(45) Date of Patent: Jan. 19, 2021

(54) ENABLING EARLY EXECUTION OF MOVE-IMMEDIATE INSTRUCTIONS HAVING VARIABLE IMMEDIATE VALUE SIZES IN PROCESSOR-BASED DEVICES

(71) Applicant: Microsoft Technology Licensing, LLC, Redmond, WA (US)

(72) Inventors: Shivam Priyadarshi, Morrisville, NC (US); Arthur Perais, Morrisville, NC (US); Vignyan Reddy Kothinti Naresh, Morrisville, NC (US); Yusuf Cagatay Tekmen, Raleigh, NC (US); Rami Mohammad Al Sheikh, Morrisville, NC (US); Rodney Wayne Smith, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/582,008

(22) Filed: Sep. 25, 2019

(51) Int. Cl.
*G06F 9/30* (2018.01)
*G06F 9/38* (2018.01)

(52) U.S. Cl.
CPC ...... *G06F 9/30032* (2013.01); *G06F 9/30123* (2013.01); *G06F 9/3832* (2013.01)

(58) Field of Classification Search
CPC . G06F 9/30032; G06F 9/30123; G06F 9/3832
See application file for complete search history.

(56) References Cited

U.S. PATENT DOCUMENTS 6,094,716 A 7/2000 Witt
6,594,754 B1 * 7/2003 Jourdan .................. G06F 9/384
                                            712/217

(Continued)

OTHER PUBLICATIONS

Samavi, Shadrokh, "Instruction-Level Parallelism and Its Exploitation", In Publication of Morgan Kaufman, Nov. 2012, 113 Pages.

(Continued)

*Primary Examiner* — Zachary K Huson
(74) *Attorney, Agent, or Firm* — Withrow & Terranova, PLLC

(57) ABSTRACT

Enabling early execution of move-immediate instructions having variable immediate value sizes in processor-based devices is disclosed. In one exemplary embodiment, a processor-based device provides a move-immediate logic circuit that detects a move-immediate instruction comprising an immediate value and a destination register. For frequently encountered immediate values, the move-immediate logic circuit allocates a physical register from an immediate physical register file (IPRF), and writes an IPRF tag corresponding to the allocated IPRF register into a most-recent mapping table (MRT) entry for the destination register. Subsequent move-immediate instructions embedding the same immediate value, as well as other dependent instructions, may then obtain the immediate value from the IPRF register by accessing the MRT entry. Additionally, the PE provides a frequent immediate table (FIT) for tracking occurrences of immediate values, and allocates IPRF registers for a given immediate value only when a count of occurrences of that immediate value exceeds a FIT threshold.

20 Claims, 6 Drawing Sheets

(56) References Cited

U.S. PATENT DOCUMENTS

| | | | |
|---|---|---|---|
| 9,454,371 | B2 | 9/2016 | Madduri et al. |
| 9,588,769 | B2 | 3/2017 | Col et al. |
| 2008/0216073 | A1* | 9/2008 | Yates .................. G06F 9/30189 |
| | | | 718/100 |
| 2013/0290680 | A1* | 10/2013 | Keller ................... G06F 9/3832 |
| | | | 712/208 |
| 2014/0189324 | A1 | 7/2014 | Combs et al. |
| 2015/0154106 | A1* | 6/2015 | Pusdesris .............. G06F 9/3826 |
| | | | 711/154 |
| 2017/0123793 | A1 | 5/2017 | Sperber et al. |
| 2017/0185410 | A1 | 6/2017 | Abernathy et al. |
| 2017/0286119 | A1* | 10/2017 | Al Sheikh ............. G06F 9/3806 |

OTHER PUBLICATIONS

Sharma, Saurabh, "Computer Organization and Architecture | Pipelining | Set 2 (Dependencies and Data Hazard)", Retrieved from https://web.archive.org/web/20170512091159/http:/www.cdn.geeksforgeeks.org/computer-organization-and-architecture-pipelining-set-2-dependencies-and-data-hazard/, May 12, 2017, 5 Pages.

Lipasti, et al., "Physical Register Inlining", In Proceedings of the 31st Annual International Symposium on Computer Architecture, Jun. 23, 2004, 11 Pages.

"International Search Report and Written Opinion Issued in PCT Application No. PCT/US20/038270", dated Oct. 12, 2020, 14 Pages.

* cited by examiner

ENABLING EARLY EXECUTION OF MOVE-IMMEDIATE INSTRUCTIONS HAVING VARIABLE IMMEDIATE VALUE SIZES IN PROCESSOR-BASED DEVICES

FIELD OF THE DISCLOSURE

The technology of the disclosure relates to execution of move-immediate instructions in processor-based devices, and, more particularly, to enabling early execution of move-immediate instructions having variable immediate value sizes.

BACKGROUND

A move-immediate instruction (e.g., MOVI) is an instruction provided by modern instruction set architectures (ISAs) for storing a constant value that is encoded as part of the move-immediate instruction itself rather than being retrieved from a specified register or memory address. Move-immediate instructions are frequently used for purposes such as loading constant values from an instruction stream, assigning an offset value to a load or store instruction, or assigning a branch offset, as non-limiting examples. Because move-immediate instructions do not require the use of complex arithmetic units, they can be executed earlier within the execution pipeline of an out-of-order processor (e.g., in the rename stage of the execution pipeline). Such early execution of a move-immediate instruction can also accelerate the execution of subsequent instructions that are dependent on the move-immediate instruction, as the dependent instructions do not have to wait for their input operand originating from the move-immediate instruction.

However, to realize the benefit of early execution, the dependent instruction must either be aware of the immediate value encoded in the move-immediate instruction and carry that immediate value with it, or alternatively must be able to access information about the physical location of the immediate value. For example, consider the following dependence chain of instructions I0 and I1:

I0: MOVI R1, #FA4D //Move immediate value #FA4D into register R1

I1: ADDI R2, R1, #1 //Add immediate value #1 to contents of register

R1 and store the sum in register R2

In the example above, instruction I0 can execute in the rename stage of the execution pipeline. For instruction I1 to become independent from instruction I0 (i.e., to break the dependence between instructions I1 and I0, thereby accelerating the execution of instruction I1), it should first be aware of the immediate value #FA4D, and then either carry the immediate value #FA4D with itself or be able to access the immediate value #FA4D when it executes.

The immediate value encoded as part of a move-immediate instruction may be of varying size, based on the underlying ISA. However, designing a processor-based device to always carry the largest possible immediate value size throughout the execution pipeline may incur considerable processor area and power overhead. One approach to alleviating such overhead is known as "physical register inlining," and involves executing move-immediate instructions having small immediate values at the rename stage of the execution pipeline. The small immediate value may then be embedded in a most-recent mapping table (MRT) entry, where dependent instructions can access the small immediate value in lieu of a physical register name. Another approach allows the move-immediate instruction to execute at the rename stage by writing its immediate value into a conventional physical register. Dependent instructions can then be renamed to use the physical register, and carry the physical register tag (which can be accessed before execution). This second approach can allow the use of larger immediate values than physical register inlining, but at the cost of requiring additional expensive write ports to the physical register file (PRF).

Accordingly, a more efficient mechanism for enabling early execution of move-immediate instructions having variable immediate value sizes is desirable.

SUMMARY

Exemplary embodiments disclosed herein include enabling early execution of move-immediate instructions having variable immediate value sizes in processor-based devices. In this regard, in one exemplary embodiment, a processor-based device provides a processing element (PE) that implements a hybrid approach allowing move-immediate instructions to be executed at the rename stage of an execution pipeline of the PE. The execution pipeline includes a move-immediate logic circuit that detects a move-immediate instruction comprising an immediate value and a destination register. The move-immediate logic circuit allocates a physical register from a dedicated register pool referred to as an immediate physical register file (IPRF), and writes an IPRF tag corresponding to the allocated IPRF register into a most-recent mapping table (MRT) entry corresponding to the destination register (along with, in some embodiments, a content indicator to indicate that the MRT entry references an IPRF register). Subsequent move-immediate instructions embedding the same immediate value, as well as other dependent instructions, may then obtain the immediate value from the IPRF register by accessing the MRT entry. In some embodiments, only immediate values that are too large to be stored in an MRT entry in conventional fashion are allocated an IPRF register. The IPRF in some embodiments may be physically part of a general-purpose physical register file (PRF), or may be a separate physical structure. Additionally, the PE provides a frequent immediate table (FIT) for tracking occurrences of immediate values, and allocates IPRF registers for a given immediate value only when a count of occurrences of that immediate value exceeds a FIT threshold.

In another exemplary embodiment, a processor-based device is provided. The processor-based device includes a PE that comprises an execution pipeline including a move-immediate logic circuit. The PE further comprises an MRT comprising a plurality of MRT entries, an FIT comprising a plurality of FIT entries, and an IPRF comprising a plurality of IPRF registers. The PE is configured to detect, using the move-immediate logic circuit of the execution pipeline, a move-immediate instruction comprising an immediate value and a destination register. The PE is further configured to determine whether a FIT entry of the plurality of FIT entries of the FIT corresponds to the immediate value. The PE is also configured to, responsive to determining that the FIT entry in the FIT corresponds to the immediate value, determine whether the FIT entry contains a valid IPRF tag corresponding to an IPRF register of the plurality of IPRF registers of the IPRF. The PE is additionally configured to, responsive to determining that the FIT entry contains a valid IPRF tag corresponding to an IPRF register of the IPRF, write the IPRF tag of the IPRF register into an MRT entry of the plurality of MRT entries of the MRT corresponding to the destination register.

In another exemplary embodiment, a method for enabling early execution of move-immediate instructions having variable immediate value sizes is provided. The method comprises detecting, using a move-immediate logic circuit of an execution pipeline of a PE of a processor-based device, a first move-immediate instruction comprising a first immediate value and a first destination register. The method further comprises determining that a FIT entry of a plurality of FIT entries of a FIT corresponds to the first immediate value. The method also comprises, responsive to determining that the first FIT entry in the FIT corresponds to the first immediate value, determining that the first FIT entry contains a valid IPRF tag corresponding to a first IPRF register of a plurality of IPRF registers of an IPRF. The method additionally comprises, responsive to determining that the first FIT entry contains the valid first IPRF tag corresponding to the first IPRF register of the IPRF, writing a first IPRF tag of the first IPRF register into a first MRT entry of a plurality of MRT entries of an MRT corresponding to the first destination register.

In another exemplary embodiment, a non-transitory computer-readable medium is provided. The computer-readable medium stores thereon computer-executable instructions which, when executed by a processor, cause the processor to detect a move-immediate instruction comprising an immediate value and a destination register. The computer-executable instructions further cause the processor to determine whether a FIT entry of a plurality of FIT entries of a FIT corresponds to the immediate value. The computer-executable instructions also cause the processor to, responsive to determining that the FIT entry in the FIT corresponds to the immediate value, determine whether the FIT entry contains a valid IPRF tag corresponding to an IPRF register of a plurality of IPRF registers of an IPRF. The computer-executable instructions additionally cause the processor to, responsive to determining that the FIT entry contains a valid IPRF tag corresponding to an IPRF register of the IPRF, write the IPRF tag of the IPRF register into an MRT entry of a plurality of MRT entries of a MRT corresponding to the destination register.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

Figure 1:
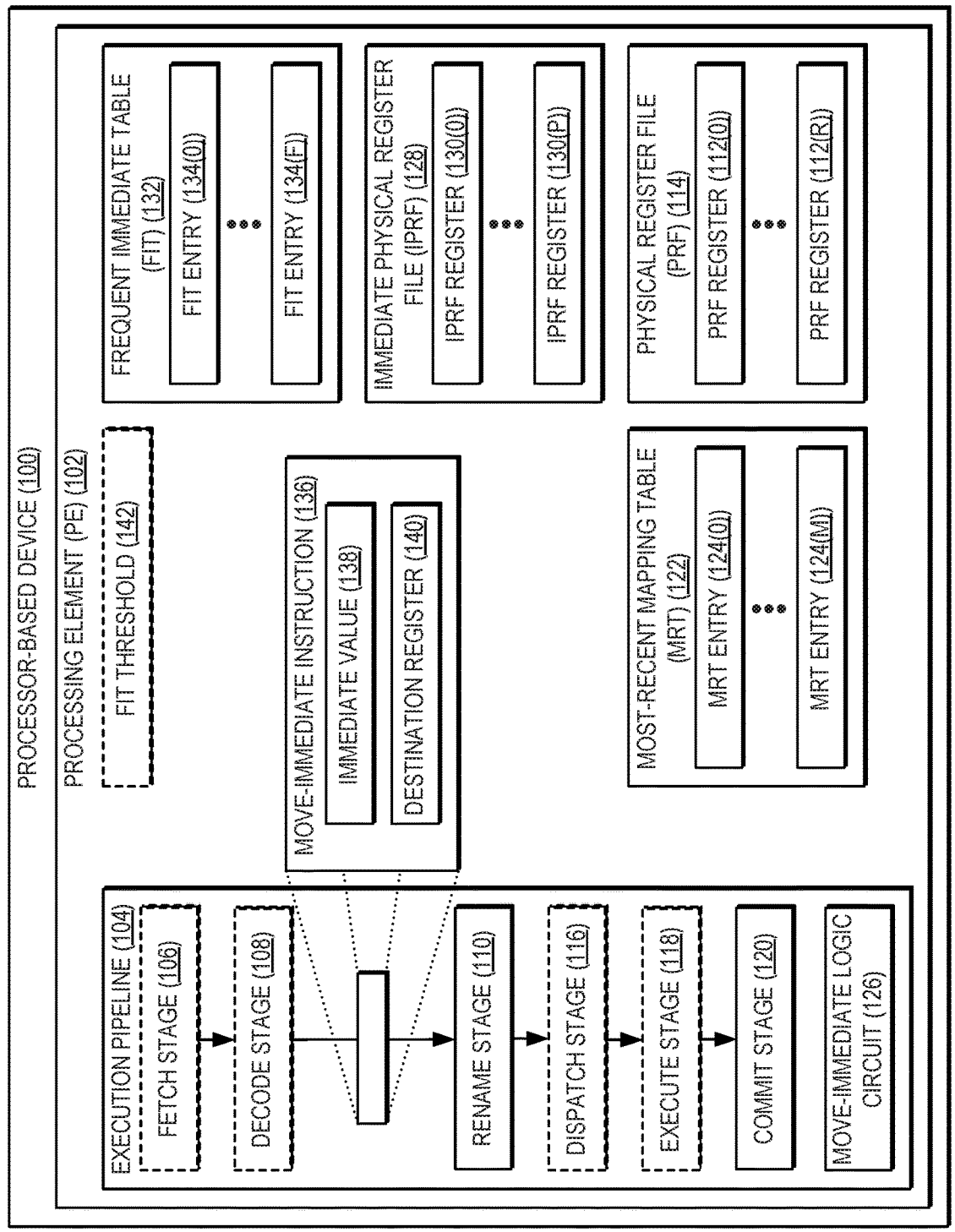
FIG. 1 is a block diagram of an exemplary processor-based device that includes a processing element (PE) comprising an execution pipeline that includes a move-immediate logic circuit configured to enable early execution of move-immediate instructions having variable immediate value sizes.
Figure 2:
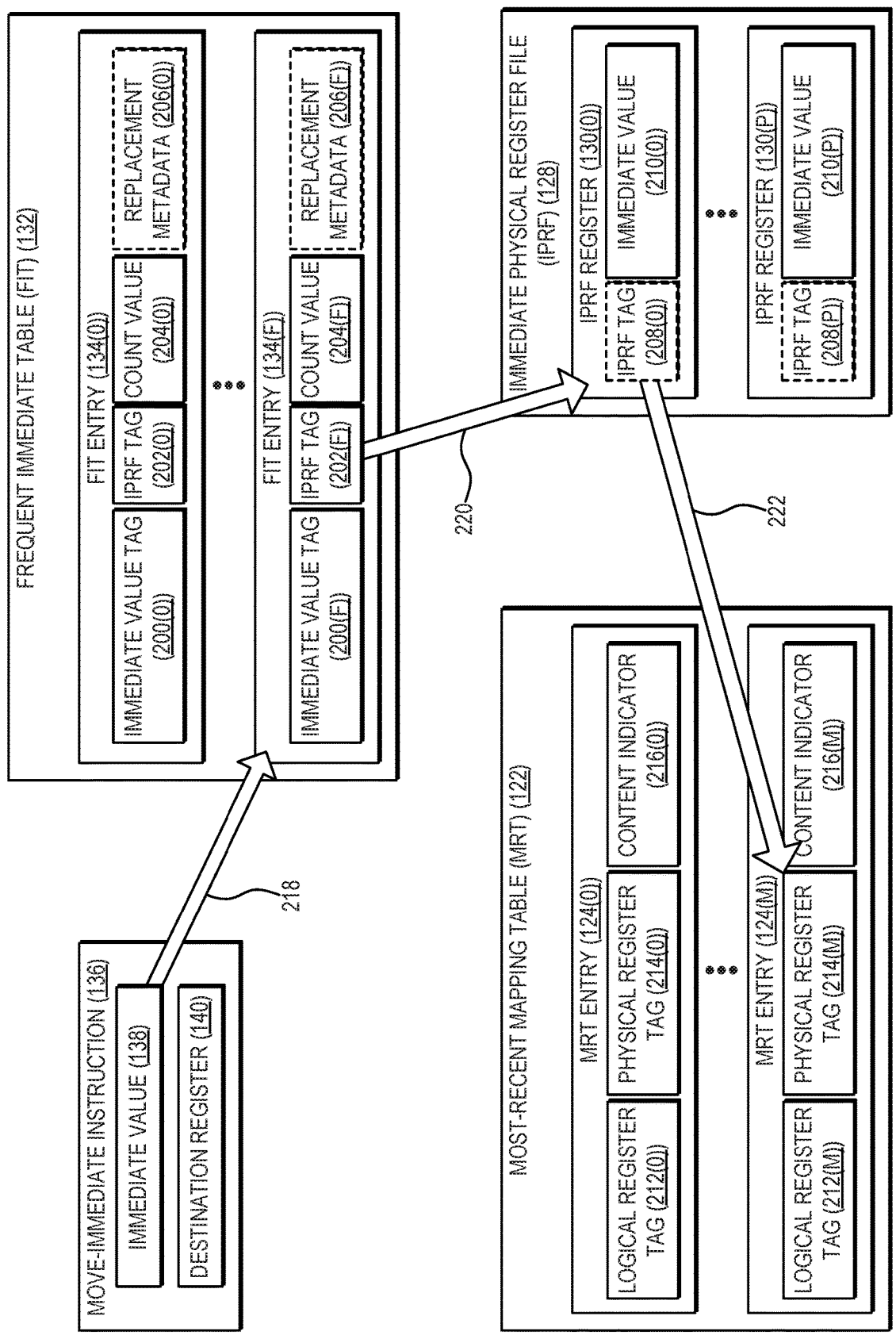
FIG. 2 is a block diagram illustrating exemplary embodiments of a frequent immediate table (FIT), an immediate physical register file (IPRF), a most-recent mapping table (MRT), and contents of entries therein.
Figure 4A:
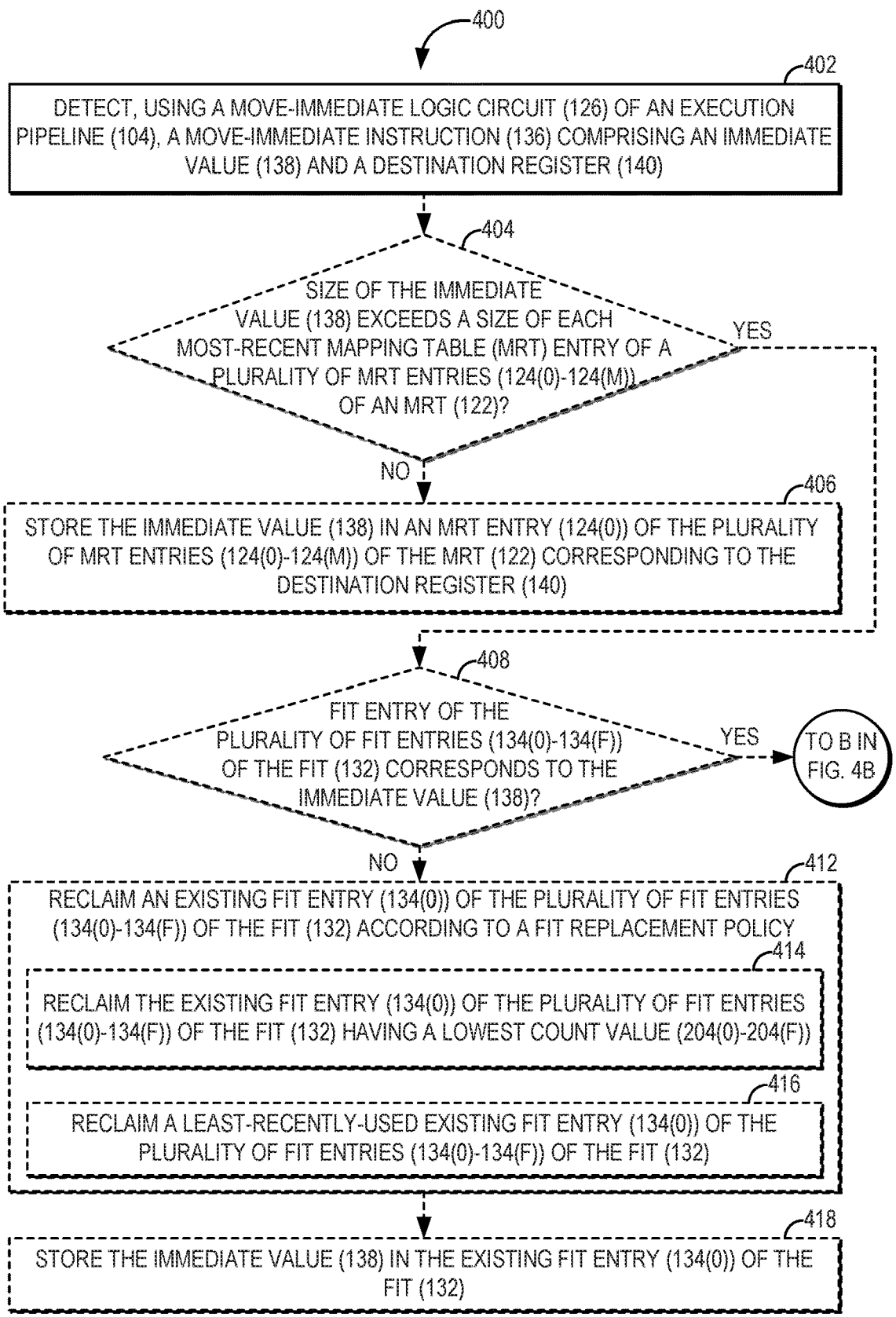
Figure 4B:
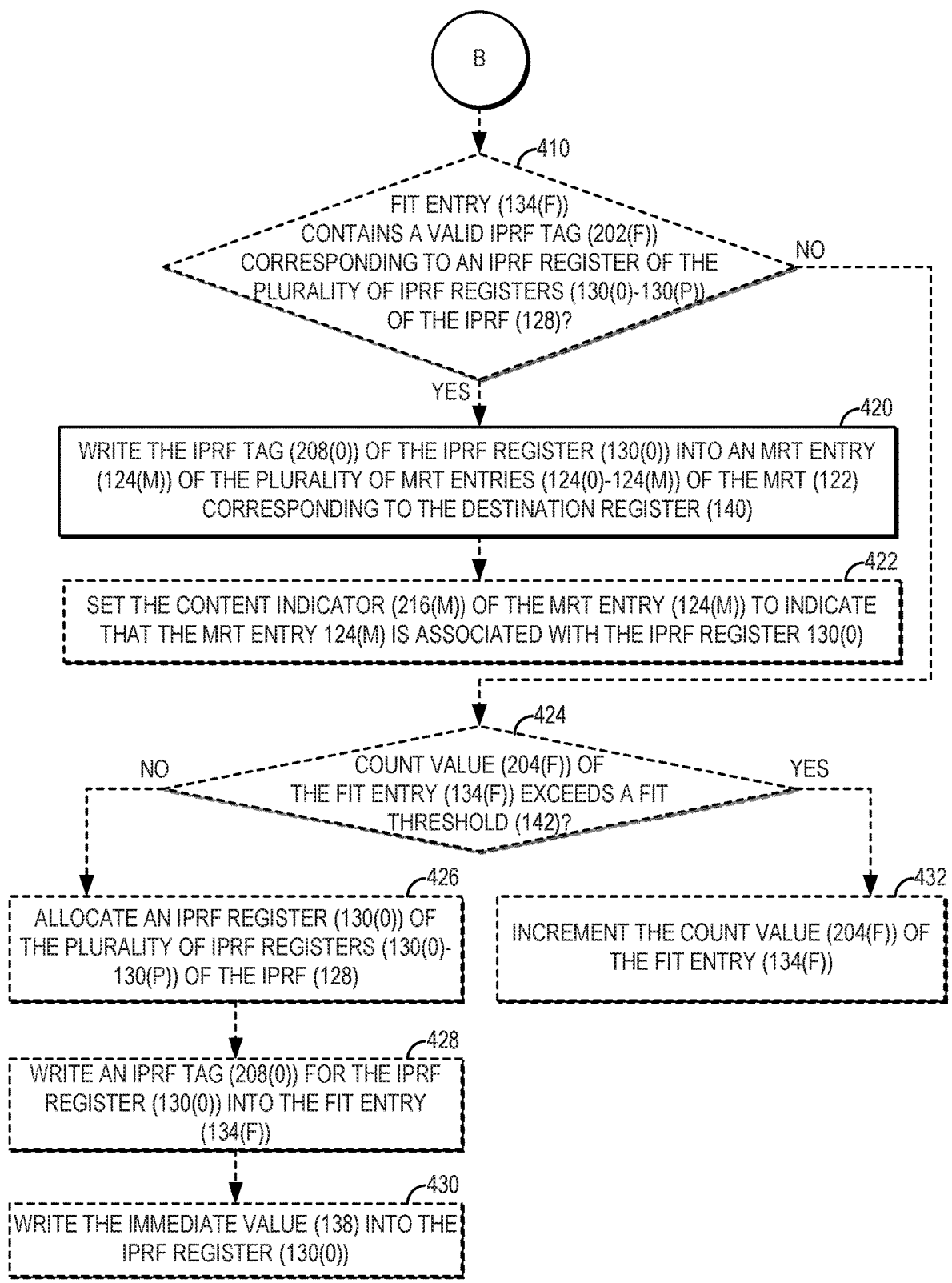
Figure 5:
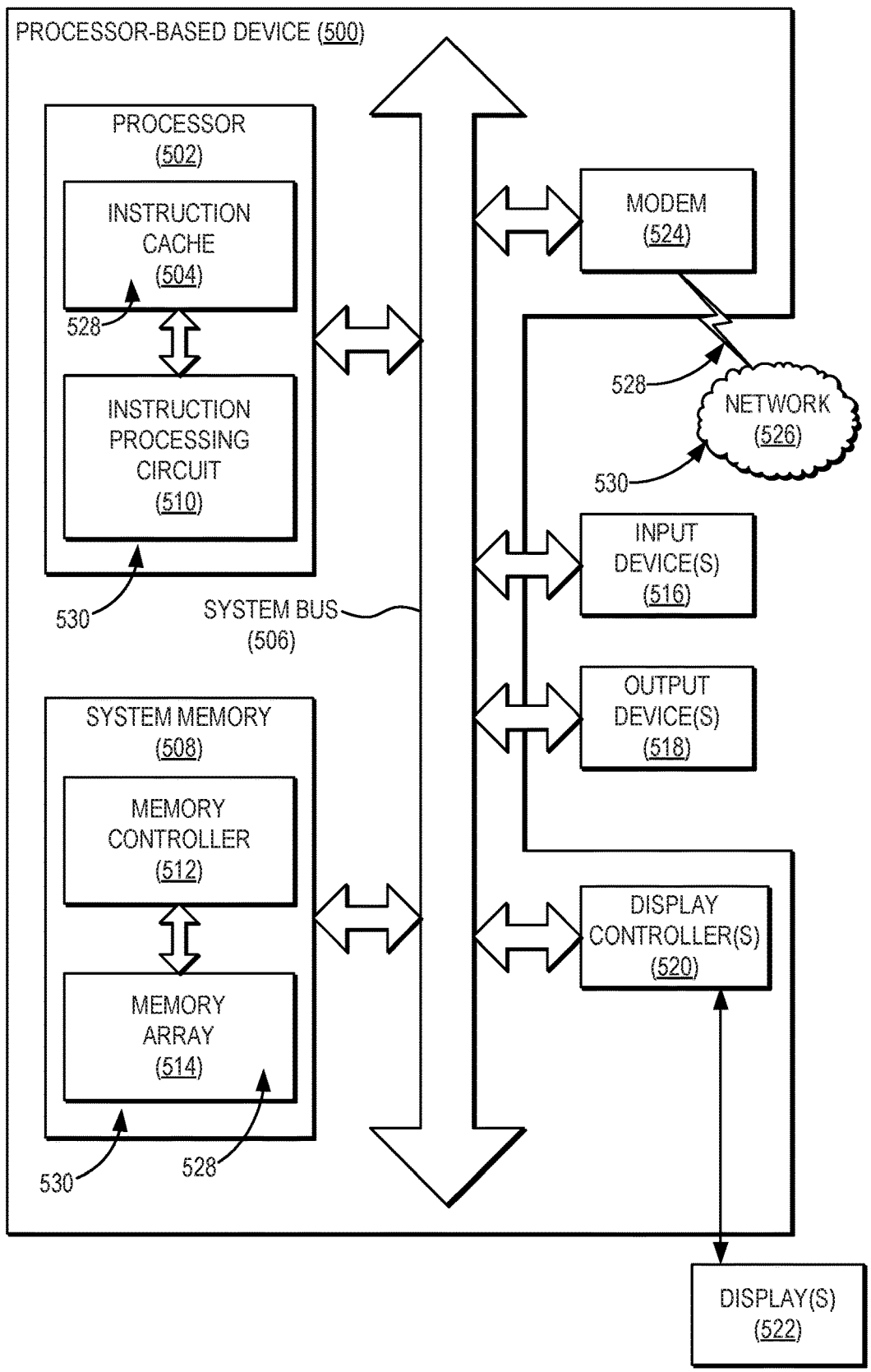

FIGS. 4A and 4B are flowcharts illustrating further exemplary operations for populating and accessing the FIT and the IPRF of FIGS. 1 and 2, according to some embodiments; and FIG. 5 is a block diagram of an exemplary processor-based device, such as the processor-based device of FIG. 1, that is configured to enable early execution of move-immediate instructions having variable immediate value sizes.

DETAILED DESCRIPTION

Exemplary embodiments disclosed herein include enabling early execution of move-immediate instructions having variable immediate value sizes in processor-based devices. In this regard, in one exemplary embodiment, a processor-based device provides a processing element (PE) that implements a hybrid approach allowing move-immediate instructions to be executed at the rename stage of an execution pipeline of the PE. The execution pipeline includes a move-immediate logic circuit that detects a move-immediate instruction comprising an immediate value and a destination register. The move-immediate logic circuit allocates a physical register from a dedicated register pool referred to as an immediate physical register file (IPRF), and writes an IPRF tag corresponding to the allocated IPRF register into a most-recent mapping table (MRT) entry corresponding to the destination register (along with, in some embodiments, a content indicator to indicate that the MRT entry references an IPRF register). Subsequent move-immediate instructions embedding the same immediate value, as well as other dependent instructions, may then obtain the immediate value from the IPRF register by accessing the MRT entry. In some embodiments, only immediate values that are too large to be stored in an MRT entry in conventional fashion are allocated an IPRF register. The IPRF in some embodiments may be physically part of a general-purpose physical register file (PRF), or may be a separate physical structure. Additionally, some embodiments may provide a frequent immediate table (FIT) for tracking occurrences of immediate values, and may allocate IPRF registers for a given immediate value only when a count of occurrences of that immediate value exceeds a FIT threshold.

In this regard, FIG. 1 illustrates an exemplary processor-based device 100 that provides a processing element (PE) 102 for processing executable instructions. The PE 102 may comprise a central processing unit (CPU) having one or more processor cores, or may comprise an individual processor core comprising a logical execution unit and associated caches and functional units. The PE 102 of FIG. 1 includes an execution pipeline 104 that is configured to perform out-of-order execution of an instruction stream comprising computer-executable instructions. In the example of FIG. 1, the execution pipeline 104 includes a fetch stage 106 for retrieving instructions for execution, and a decode stage 108 for translating fetched instructions into control signals for instruction execution. The execution pipeline 104 further includes a rename stage 110 for allocating physical register file (PRF) registers 112(0)-112(R) from a PRF 114, and a dispatch stage 116 for issuing instructions for execution. Finally, the execution pipeline also includes an execute stage 118 for sending instructions and operands to execution units (not shown), and a commit stage 120 for irrevocably updating the architectural state of the PE 102 based on the results of instruction execution. It is to be understood that some embodiments of the processor-based device 100 may comprise multiple PEs 102 rather than the single PE 102 shown in the example of FIG. 1, and further that some embodiments of the PE 102 may include fewer or more stages within the execution pipeline 104 than those illustrated in the example of FIG. 1.

As noted above, the PE 102 includes the PRF 114, which contains a plurality of PRF registers 112(0)-112(R). The PRF registers 112(0)-112(R) of the PRF 114 may be individually addressed and used as intermediate data storage between a system memory (not shown) and functional units (not shown) of the PE 102. To enable register renaming, the PE 102 also includes a most-recent mapping table (MRT) 122, containing a plurality of MRT entries 124(0)-124(M). As discussed below in greater detail with respect to FIG. 2, each of the MRT entries 124(0)-124(M) represents a mapping of a logical register to one of the PRF registers 112(0)-112(R) of the PRF 114, which enables the PE 102 to establish data dependencies between instructions.

The processor-based device 100 of FIG. 1 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 include elements in addition to those illustrated in FIG. 1. For example, the PE 102 may further include one or more functional units, instruction caches, unified caches, memory controllers, interconnect buses, and/or additional memory devices, caches, and/or controller circuits.

As discussed above, because move-immediate instructions do not require the use of complex arithmetic units, they can be executed earlier within the execution pipeline 104 of the PE 102 (e.g., in the rename stage 110 of the execution pipeline 104). Such early execution of a move-immediate instruction can also accelerate the execution of subsequent instructions that are dependent on the move-immediate instruction, as the dependent instructions do not have to wait for their input operand originating from the move-immediate instruction. However, the variable size of immediate values poses challenges to efficient early execution. For example, designing the processor-based device 100 to always carry the largest possible immediate value size throughout the execution pipeline 104 may incur considerable processor area and power overhead. Moreover, other approaches may be effective only for smaller intermediate values, or may require additional expensive write ports to the PRF 114.

In this regard, the PE 102 is configured to enable early execution of move-immediate instructions having variable immediate value sizes in the processor-based device 100. To accomplish this, the execution pipeline 104 includes a move-immediate logic circuit 126, which may be implemented as a separate element within the execution pipeline 104 as shown in FIG. 1, or integrated in whole or in part within one or more stages of the execution pipeline 104. As non-limiting examples, the move-immediate logic circuit 126 may be integrated into the rename stage 110 and/or the commit stage 120 of the execution pipeline 104. The PE 102 further includes dedicated storage for immediate values in the form of an immediate physical register file (IPRF) 128, comprising a plurality of IPRF registers 130(0)-130(P). The IPRF 128, in some embodiments, may be implemented as a physical structure separate from the PRF 114 as shown in FIG. 1, or may be a subset of registers within the PRF 114. Finally, the PE 102 includes a frequent immediate table (FIT) 132 comprising a plurality of FIT entries 134(0)-134(F). As discussed in greater detail below with respect to FIG. 2, the FIT 132 is used to track occurrences of immediate values, and enables the move-immediate logic circuit 126 to limit allocation of IPRF registers 130(0)-130(P) only for frequently-encountered immediate values.

To enable early execution of move-immediate instructions having variable immediate value sizes, the move-immediate logic circuit 126 of the execution pipeline 104 detects a move-immediate instruction 136 comprising an immediate value 138 and a destination register 140. The move-immediate logic circuit 126 determines (e.g., in the rename stage 110 of the execution pipeline 104) whether one of the FIT entries 134(0)-134(F) corresponds to the immediate value 138. If so, the move-immediate logic circuit 126 next determines whether the FIT entry 134(F) contains a valid IPRF tag that corresponds to one of the IPRF registers 130(0)-130(P) of the IPRF 128. If so, the move-immediate logic circuit 126 writes the IPRF tag of the corresponding IPRF register 130(0)-130(P) into one of the MRT entries 124(0)-124(M) of the MRT 122 corresponding to the destination register 140 of the move-immediate instruction 136. In this manner, subsequent move-immediate instructions embedding the same immediate value 138, as well as other dependent instructions, may access the MRT entry 124(0)-124(M) and, based on the IPRF tag stored in the MRT entry 124(0)-124(M), access the corresponding IPRF register 130(0)-130(P), thus enabling early execution.

Operations for allocating and accessing the FIT entries 134(0)-134(F) of the FIT 132 and the IPRF registers 130(0)-130(P) of the IPRF 128 are discussed in greater detail below with respect to FIG. 2. Note that, in some embodiments, the IPRF registers 130(0)-130(P) may only be allocated for immediate values that occur with a frequency higher than a FIT threshold 142. The FIT threshold 142 according to some embodiments may be dynamically updated based on a program phase of an executing program.

FIG. 2 illustrates in greater detail the contents of and interactions among the FIT 132, the IPRF 128, and the MRT 122 of FIG. 1 when processing the move-immediate instruction 136 by the move-immediate logic circuit 126 of FIG. 1, according to an exemplary embodiment. As noted above with respect to FIG. 1, the FIT 132 in some embodiments is used to track occurrences of immediate values such as the immediate value 138. The FIT 132 thus enables the move-immediate logic circuit 126 of FIG. 1 to allocate an IPRF register of the plurality of IPRF registers 130(0)-130(P) only for frequently occurring immediate values. Each of the FIT entries 134(0)-134(F) of the FIT 132 includes a respective immediate value tag 200(0)-200(F) that associates the corresponding immediate value with that FIT entry 134(0)-134(F). The immediate value tags 200(0)-200(F) may comprise, as non-limiting examples, a subset of bits of the corresponding immediate value, or a hash value generated based on the corresponding immediate value. Each of the FIT entries 134(0)-134(F) also includes a respective IPRF tag 202(0)-202(F) that may be used to indicate which IPRF register of the plurality of IPRF registers 130(0)-130(P), if any, store the immediate value associated with that FIT entry 134(0)-134(F). The IPRF tags 202(0)-202(F) may comprise, for instance, register numbers of the corresponding IRPF registers 130(0)-130(P). The FIT entries 134(0)-134(F) further include respective count values 204(0)-204(F) that may be used to track how many times the immediate values associated with the FIT entries 134(0)-134(F) have been encountered. According to some embodiments, the count values 204(0)-204(F) may comprise N-bit saturating counters, where N specifies an implementation-specific number of bits for the count values 204(0)-204(F). Some embodiments may also provide that the FIT entries 134(0)-134(F) additionally include replacement metadata 206(0)-206(F) that may be used to implement a FIT replacement policy, as discussed in greater detail below.

The IPRF 128 provides a pool of IPRF registers 130(0)-130(P) for storing immediate values such as the immediate value 138. Each of the IPRF registers 130(0)-130(P) is associated with a corresponding IPRF tag 208(0)-208(P), which may comprise a register number of the IPRF register 130(0)-130(P), as a non-limiting example. In some embodiments, the IPRF tag 208(0)-208(P) may be associated with and used to identify the corresponding IPRF registers 130(0)-130(P), but may not be expressly stored as part of the IPRF registers 130(0)-130(P) as shown in FIG. 2. The IPRF registers 130(0)-130(P) also each store a corresponding immediate value 210(0)-210(P) for later retrieval by early-executing move-immediate instructions and/or other dependent instructions.

Finally, the MRT entries 124(0)-124(M) of the MRT 122 each store data that is used conventionally to map logical registers to physical registers for register renaming purposes. Accordingly, the MRT entries 124(0)-124(M) include logical register tags 212(0)-212(M) (e.g., a register number of a logical register) and corresponding physical register tags 214(0)-214(M) (e.g., a register number of a PRF register 112(0)-112(R) or an IPRF register 130(0)-130(P)). To facilitate the use of the IPRF registers 130(0)-130(P) for storing immediate values, the MRT entries 124(0)-124(M) further provide content indicators 216(0)-216(M) to indicate to the move-immediate logic circuit 126 the type of content stored in the MRT entries 124(0)-124(M). For example, in some embodiments, the content indicators 216(0)-216(M) comprise two (2)-bit indicators having four potential values. A value of "00" indicates that the corresponding MRT entry 124(0)-124(M) is being used for conventional register renaming, and thus the MRT entry 124(0)-124(M) points to one of the PRF registers 112(0)-112(R) of the PRF 114. A value of "01" indicates that the corresponding MRT entry 124(0)-124(M) stores an small immediate value directly within the MRT entry 124(0)-124(M). A value of "10" indicates that the corresponding MRT entry 124(0)-124(M) points to one of the IPRF registers 130(0)-130(P) of the IPRF 128. Finally, a value of "11" may be reserved, or may indicate undefined behavior or an invalid state.

In exemplary operation, the move-immediate logic circuit 126 of the execution pipeline 104 detects the move-immediate instruction 136 comprising the immediate value 138 and the destination register 140. The move-immediate logic circuit 126 determines (e.g., in the rename stage 110 of the execution pipeline 104) whether one of the immediate value tags 200(0)-200(F) of the FIT entries 134(0)-134(F) corresponds to the immediate value 138. In the example of FIG. 2, assume that the FIT entry 134(F) corresponds to the immediate value 138, as indicated by arrow 218. The move-immediate logic circuit 126 next determines whether the FIT entry 134(F) contains a valid IPRF tag 202(F) that corresponds to one of the IPRF registers 130(0)-130(P) of the IPRF 128. In FIG. 2, the IPRF tag 202(F) of the FIT entry 134(F) corresponds to the IPRF register 130(0), as indicated by arrow 220. This means that the immediate value 138 has been previously encountered by the move-immediate logic circuit 126, and has allocated the IPRF register 130(0) to store the immediate value 138 as the immediate value 210(0).

The move-immediate logic circuit 126 then writes the IPRF tag 208(0) of the IPRF register 130(0) into one of the MRT entries 124(0)-124(M) of the MRT 122 having a logical register tag 212(0)-212(M) corresponding to the destination register 140 of the move-immediate instruction 136, as indicated by arrow 222. As seen in FIG. 2, the MRT entry 124(M) is assumed to correspond to the destination register 140, so the IPRF tag 208(0) of the IPRF register 130(0) is written to the MRT entry 124(M). In some embodiments, the content indicator 216(M) is also updated to indicate that the MRT entry 124(M) points to the IPRF register 130(0). In this manner, subsequent move-immediate instructions embedding the same immediate value 138, as well as other dependent instructions, may access the MRT entry 124(M) and, based on the content indicator 216(M) and the IPRF tag 208(0) stored in the MRT entry 124(M), access the immediate value 210(0) from the IPRF register 130(0).

In some embodiments, the move-immediate logic circuit 126 may first determine whether the size of the immediate value 138 exceeds a size of the MRT entries 124(0)-124(M) (i.e., whether the immediate value 138 is too large to be stored within one of the MRT entries 124(0)-123(M). If the immediate value 138 does not exceed the size of the MRT entries 124(0)-124(M), the move-immediate logic circuit 126 may store the immediate value 138 directly within one of the MRT entries 124(0)-124(M) corresponding to the destination register 140.

According to some embodiments, if the move-immediate logic circuit 126 determines that none of the FIT entries 134(0)-134(F) of the FIT 132 correspond to the immediate value 138, the move-immediate logic circuit 126 may reclaim one of the existing FIT entries 134(0)-134(F) according to a FIT replacement policy, and then use the reclaimed FIT entry 134(0)-134(F) to store the immediate value 138. As non-limiting examples, the FIT replacement policy may comprise reclaiming one of the FIT entries 134(0)-134(F) having a lowest count value 204(0)-204(F), and/or may comprise reclaiming a least-recently-used existing FIT entry 134(0)-134(F). In the latter scenario, the least-recently-used existing FIT entry 134(0)-134(F) may be determined based on the replacement metadata 206(0)-206(F) stored within the FIT entries 134(0)-134(F). This FIT replacement policy may be particularly useful in cases where particular immediate value occurred frequently within a specific phase of an executing program but not within other phases, even if the corresponding count values 204(0)-204(F) reached high values.

Some embodiments provide that if the move-immediate logic circuit 126 determines that a FIT entry, such as the FIT entry 134(F), exists for the immediate value 138 but does not contain a valid IPRF tag 202(F), the move-immediate logic circuit 126 determines whether the count value 204(F) of the FIT entry 134(F) exceeds the FIT threshold 142. If so, the move-immediate logic circuit 126 may conclude that the immediate value 138 has occurred with sufficient frequency to justify allocating one of the IPRF registers 130(0)-130(P) to the immediate value 138. Accordingly, the move-immediate logic circuit 126 allocates an IPRF register such as the IPRF register 130(0), writes the IPRF tag 208(0) for the IPRF register 130(0) into the IPRF tag 202(F) of the FIT entry 134(F), and writes the immediate value 138 into the immediate value 210(0) of the IPRF register 130(0). In some embodiments, the immediate value 138 may be written into the allocated IPRF register 130(0) in the rename stage 110 of the execution pipeline 104, which may require the IPRF 128 to have an additional write port from the rename stage 110. If the count value 204(F) of the FIT entry 134(F) does not exceed the FIT threshold 142, the move-immediate logic circuit 126 may increment the count value 204(F) of the FIT entry 134(F) (e.g., during the commit stage 120 of the execution pipeline 104).

Figure 3:
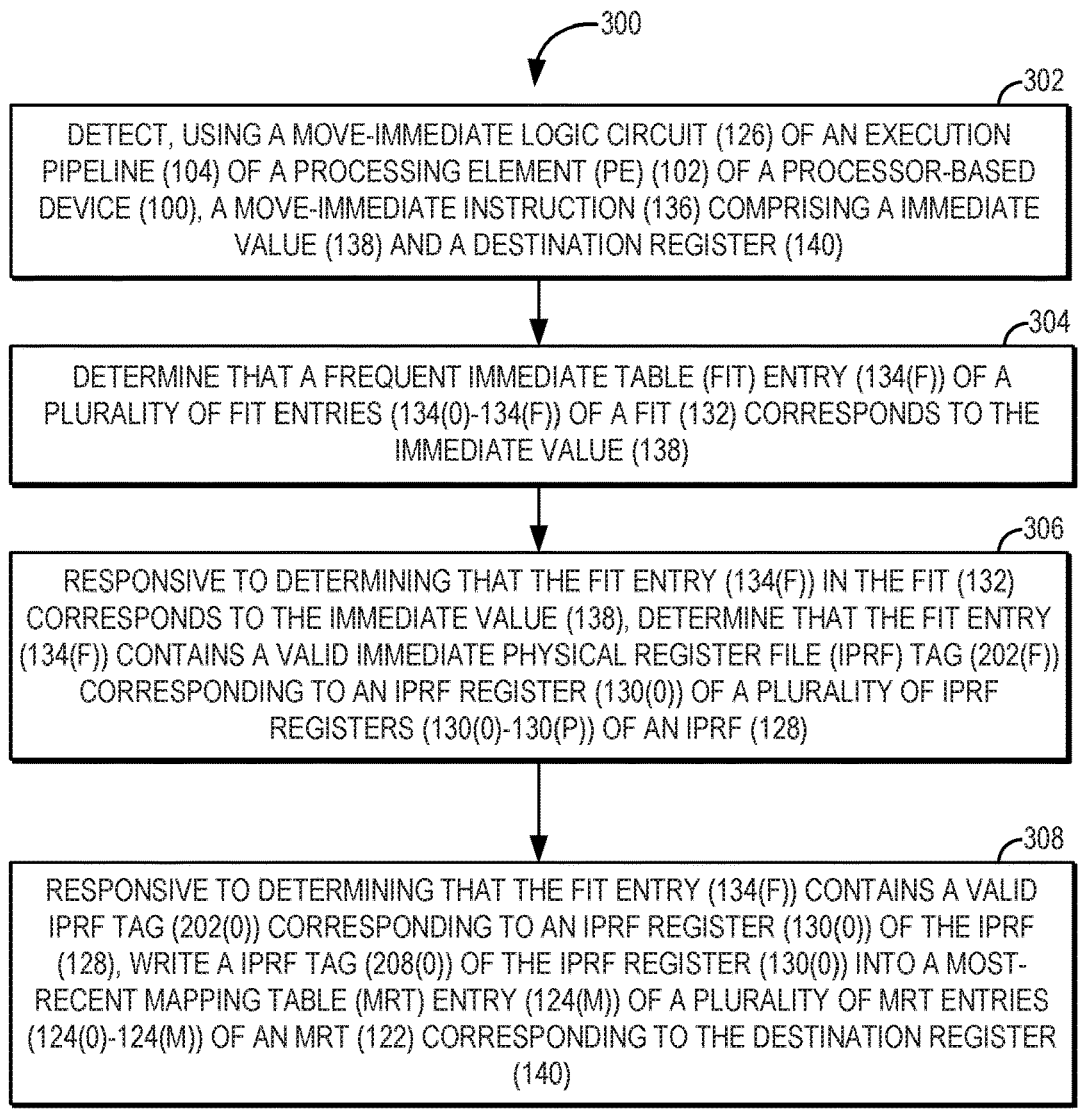
FIG. 3 is a flowchart illustrating exemplary operations for enabling early execution of move-immediate instructions having variable immediate value sizes, according to some embodiments.

To illustrate exemplary operations for enabling early execution of move-immediate instructions having variable immediate value sizes according to some embodiments, FIG. 3 is provided. Elements of FIGS. 1 and 2 are referenced in describing FIG. 3 for the sake of clarity. Operations in FIG. 3 begin with the move-immediate logic circuit 126 of the execution pipeline 104 of the PE 102 of the processor-based device 100 detecting the move-immediate instruction 136 comprising the immediate value 138 and the destination register 140 (block 302). The move-immediate logic circuit 126 determines that a FIT entry (such as the FIT entry 134(F)) of the plurality of FIT entries 134(0)-134(F) of the FIT 132 corresponds to the immediate value 138 (block 304).

Responsive to determining that the FIT entry 134(F) in the FIT 132 corresponds to the immediate value 138, the move-immediate logic circuit 126 next determines that the FIT entry 134(F) contains a valid IPRF tag 202(F) corresponding to an IPRF register (such as the IPRF register 130(0)) of the plurality of IPRF registers 130(0)-130(P) of the IPRF 128 (block 306). In response to determining that the FIT entry 134(F) contains a valid IPRF tag 202(F) corresponding to an IPRF register 130(0) of the IPRF 128, the move-immediate logic circuit 126 writes the IPRF tag 208(0) of the IPRF register 130(0) into an MRT entry (such as the MRT entry 124(M)) of the plurality of MRT entries 124(0)-124(M) of the MRT 122 corresponding to the destination register 140 (block 308).

FIGS. 4A and 4B illustrate in greater detail further exemplary operations for populating and accessing the FIT 132 and the IPRF 128 of FIGS. 1 and 2, according to some embodiments. For the sake of clarity, elements of FIGS. 1 and 2 are referenced in describing FIGS. 4A and 4B. Operations begin in FIG. 4A with the move-immediate logic circuit 126 detecting the move-immediate instruction 136 comprising the immediate value 138 and the destination register 140 (block 402). In some embodiments, the move-immediate logic circuit 126 may determine whether a size of the immediate value 138 exceeds a size of each MRT entry of the plurality of MRT entries 124(0)-124(M) of the MRT 122 (block 404). If not, the immediate value 138 is stored in an MRT entry, such as the MRT entry 124(0), of the plurality of MRT entries 124(0)-124(M) of the MRT 122 corresponding to the destination register 140 (block 406). However, if the move-immediate logic circuit 126 determines at decision block 404 that the size of the immediate value 138 does not exceed a size of each MRT entry of the plurality of MRT entries 124(0)-124(M) of the MRT 122, the move-immediate logic circuit 126 in some embodiments may next determine whether a FIT entry of the plurality of FIT entries 134(0)-134(F) of the FIT 132 corresponds to the immediate value 138 (block 408). If so, processing resumes at block 410 of FIG. 4B.

If the move-immediate logic circuit 126 determines at decision block 408 that none of the FIT entries 134(0)-134(F) within the FIT 132 correspond to the immediate value 138, the move-immediate logic circuit 126 according to some embodiments may reclaim an existing FIT entry, such as the FIT entry 134(0), of the plurality of FIT entries 134(0)-134(F) of the FIT 132 according to a FIT replacement policy (block 412). Some embodiments may provide that the operations of block 412 for reclaiming the existing FIT entry 134(0) may comprise reclaiming the existing FIT entry 134(0) of the plurality of FIT entries 134(0)-134(F) of the FIT 132 having a lowest count value 204(0)-204(F) (block 414). According to some embodiments, the operations of block 412 for reclaiming the existing FIT entry 134(0) may comprise reclaiming a least-recently-used existing FIT entry 134(0) of the plurality of FIT entries 134(0)-134(F) of the FIT 132 (block 416). The move-immediate logic circuit 126 may then store the immediate value 138 in the existing FIT entry 134(0) of the FIT 132 (block 418).

Referring now to FIG. 4B, if the move-immediate logic circuit 126 determines at decision block 408 of FIG. 4A that a FIT entry (such as the FIT entry 134(F)) of the plurality of FIT entries 134(0)-134(F) of the FIT 132 corresponds to the immediate value 138, the move-immediate logic circuit 126 may next determine whether the FIT entry 134(F) contains a valid IPRF tag 202(F) corresponding to an IPRF register of the plurality of IPRF registers 130(0)-130(P) of the IPRF 128 (block 410). If so, the move-immediate logic circuit 126 writes the IPRF tag 208(0) of the IPRF register 130(0) into an MRT entry, such as the MRT entry 124(M), of the plurality of MRT entries 124(0)-124(M) of the MRT 122 corresponding to the destination register 140 (block 420). The move-immediate logic circuit 126 may also set the content indicator 216(M) of the MRT entry 124(M) to indicate that the MRT entry 124(M) is associated with the first IPRF register 130(0) (block 422).

If the move-immediate logic circuit 126 determines at decision block 410 that the FIT entry 134(F) does not contain a valid IPRF tag 202(F), the move-immediate logic circuit 126 in some embodiments determines whether the count value 204(F) of the FIT entry 134(F) exceeds the FIT threshold 142 (block 424). If so, the move-immediate logic circuit 126 allocates an IPRF register, such as the IPRF register 130(0), of the plurality of IPRF registers 130(0)-130(P) of the IPRF 128 (block 426). The move-immediate logic circuit 126 next writes the IPRF tag 208(0) for the IPRF register 130(0) into the FIT entry 134(F) (block 428). Finally, the move-immediate logic circuit 126 writes the immediate value 138 into the IPRF register 130(0) (block 430). If the move-immediate logic circuit 126 determines at decision block 424 that the count value 204(F) does not exceed the FIT threshold 142, the move-immediate logic circuit 126 increments the count value 204(0) of the FIT entry 134(0) (block 432).

FIG. 5 is a block diagram of an exemplary processor-based device 500, such as the processor-based device 100 of FIG. 1, that enables early execution of move-immediate instructions having variable immediate value sizes. The processor-based device 500 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 500 includes a processor 502. The processor 502 represents one or more general-purpose processing circuits, such as a microprocessor, central processing unit, or the like, and may correspond to the PE 102 of FIG. 1. The processor 502 is configured to execute processing logic in instructions for performing the operations and steps discussed herein. In this example, the processor 502 includes an instruction cache 504 for temporary, fast access memory storage of instructions and an instruction processing circuit 510. Fetched or prefetched instructions from a memory, such as from a system memory 508 over a system bus 506, are stored in the instruction cache 504. The instruction processing circuit 510 is configured to process instructions fetched into the instruction cache 504 and process the instructions for execution.

The processor 502 and the system memory 508 are coupled to the system bus 506 and can intercouple peripheral devices included in the processor-based device 500. As is well known, the processor 502 communicates with these other devices by exchanging address, control, and data information over the system bus 506. For example, the processor 502 can communicate bus transaction requests to a memory controller 512 in the system memory 508 as an example of a peripheral device. Although not illustrated in FIG. 5, multiple system buses 506 could be provided, wherein each system bus constitutes a different fabric. In this example, the memory controller 512 is configured to provide memory access requests to a memory array 514 in the system memory 508. The memory array 514 is comprised of an array of storage bit cells for storing data. The system memory 508 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 506. As illustrated in FIG. 5, these devices can include the system memory 508, one or more input devices 516, one or more output devices 518, a modem 524, and one or more display controllers 520, as examples. The input device(s) 516 can include any type of input device, including, but not limited to, input keys, switches, voice processors, etc. The output device(s) 518 can include any type of output device, including, but not limited to, audio, video, other visual indicators, etc. The modem 524 can be any device configured to allow exchange of data to and from a network 526. The network 526 can be any type of network, including, but not limited to, a wired or wireless network, a private or public network, a local area network (LAN), a wireless local area network (WLAN), a wide area network (WAN), a BLUETOOTH™ network, and the Internet. The modem 524 can be configured to support any type of communications protocol desired. The processor 502 may also be configured to access the display controller(s) 520 over the system bus 506 to control information sent to one or more displays 522. The display(s) 522 can include any type of display, including, but not limited to, a cathode ray tube (CRT), a liquid crystal display (LCD), a plasma display, etc.

The processor-based device 500 in FIG. 5 may include a set of instructions 528 that may be encoded with the reach-based explicit consumer naming model to be executed by the processor 502 for any application desired according to the instructions. The instructions 528 may be stored in the system memory 508, processor 502, and/or instruction cache 504 as examples of non-transitory computer-readable medium 530. The instructions 528 may also reside, completely or at least partially, within the system memory 508 and/or within the processor 502 during their execution. The instructions 528 may further be transmitted or received over the network 526 via the modem 524, such that the network 526 includes the computer-readable medium 530.

While the computer-readable medium 530 is shown in an exemplary embodiment to be a single medium, the term "computer-readable medium" should be taken to include a single medium or multiple media (e.g., a centralized or distributed database, and/or associated caches and servers) that store the one or more sets of instructions 528. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device, comprising:
    a processing element (PE), comprising:
        an execution pipeline comprising a move-immediate logic circuit;
        a most-recent mapping table (MRT) comprising a plurality of MRT entries;
        a frequent immediate table (FIT) comprising a plurality of FIT entries; and
        an immediate physical register file (IPRF) comprising a plurality of IPRF registers;
    the PE configured to:
        detect, using the move-immediate logic circuit of the execution pipeline, a move-immediate instruction comprising an immediate value and a destination register;
        determine whether a FIT entry of the plurality of FIT entries of the FIT corresponds to the immediate value;
        responsive to determining that the FIT entry in the FIT corresponds to the immediate value, determine whether the FIT entry contains a valid IPRF tag corresponding to an IPRF register of the plurality of IPRF registers of the IPRF; and
        responsive to determining that the FIT entry contains a valid IPRF tag corresponding to an IPRF register of the IPRF, write the IPRF tag of the IPRF register into an MRT entry of the plurality of MRT entries of the MRT corresponding to the destination register.

2. The processor-based device of claim 1, wherein the PE is further configured to:
    determine whether a size of the immediate value exceeds a size of each MRT entry of the plurality of MRT entries of the MRT; and
    responsive to determining that the size of the immediate value does not exceed the size of the MRT entry of the MRT, store the immediate value in an MRT entry of the plurality of MRT entries of the MRT corresponding to the destination register;
    wherein the PE is configured to determine whether the FIT entry of the plurality of FIT entries of the FIT corresponds to the immediate value responsive to determining that the size of the immediate value exceeds the size of each MRT entry of the plurality of MRT entries of the MRT.

3. The processor-based device of claim 1, wherein the PE is further configured to, further responsive to determining that the FIT entry contains the valid IPRF tag corresponding to the IPRF register of the IPRF, set a content indicator of the MRT entry to indicate that the MRT entry is associated with the IPRF register.

4. The processor-based device of claim 1, wherein the PE is further configured to, responsive to determining that no FIT entry in the FIT corresponds to the immediate value:
    reclaim an existing FIT entry of the plurality of FIT entries of the FIT according to a FIT replacement policy; and
    store the immediate value in the existing FIT entry of the plurality of FIT entries of the FIT.

5. The processor-based device of claim 4, wherein the FIT replacement policy comprises reclaiming the existing FIT entry of the plurality of FIT entries of the FIT having a lowest count value.

6. The processor-based device of claim 4, wherein the FIT replacement policy comprises reclaiming a least-recently-used existing FIT entry of the plurality of FIT entries of the FIT.

7. The processor-based device of claim 1, wherein the PE is further configured to, responsive to determining that the FIT entry does not contain a valid IPRF tag corresponding to the IPRF register of the IPRF:
   allocate an IPRF register of the plurality of IPRF registers of the IPRF;
   write an IPRF tag for the IPRF register into the FIT entry; and
   write the immediate value into the IPRF register.

8. The processor-based device of claim 7, wherein the PE is further configured to determine whether a count value of the FIT entry exceeds a FIT threshold;
   wherein the PE is configured to allocate the IPRF register, write the IPRF tag for the IPRF register into the FIT entry, and write the immediate value into the IPRF register responsive to determining that the count value of the FIT entry exceeds the FIT threshold.

9. The processor-based device of claim 8, wherein the PE is further configured to, responsive to determining that the count value of the FIT entry does not exceed the FIT threshold, increment the count value of the FIT entry.

10. A method for enabling early execution of move-immediate instructions having variable immediate value sizes, comprising:
    detecting, using a move-immediate logic circuit of an execution pipeline of a processing element (PE) of a processor-based device, a first move-immediate instruction comprising a first immediate value and a first destination register;
    determining that a first frequent immediate table (FIT) entry of a plurality of FIT entries of a FIT corresponds to the first immediate value;
    responsive to determining that the first FIT entry in the FIT corresponds to the first immediate value, determining that the first FIT entry contains a valid first immediate physical register file (IPRF) tag corresponding to a first IPRF register of a plurality of IPRF registers of an IPRF; and
    responsive to determining that the first FIT entry contains the valid first IPRF tag corresponding to the first IPRF register of the IPRF, writing a first IPRF tag of the first IPRF register into a first most-recent mapping table (MRT) entry of a plurality of MRT entries of an MRT corresponding to the first destination register.

11. The method of claim 10, further comprising determining that a size of the first immediate value exceeds a size of each MRT entry of the plurality of MRT entries of the MRT;
    wherein determining that the first FIT entry of the plurality of FIT entries of the FIT corresponds to the first immediate value is responsive to determining that the size of the first immediate value exceeds the size of each MRT entry of the plurality of MRT entries of the MRT.

12. The method of claim 10, further comprising:
    detecting, using the move-immediate logic circuit, a second move-immediate instruction comprising a second immediate value and a second destination register;
    determining that a size of the second immediate value does not exceed a size of each MRT entry of the plurality of MRT entries of the MRT; and
    responsive to determining that the size of the second immediate value does not exceed the size of each MRT entry of the plurality of MRT entries of the MRT, storing the second immediate value in a second MRT entry of the plurality of MRT entries of the MRT corresponding to the second destination register.

13. The method of claim 10, further comprising, further responsive to determining that the first FIT entry contains the valid first IPRF tag corresponding to the first IPRF register of the IPRF, setting a content indicator of the first MRT entry to indicate that the first MRT entry is associated with the first IPRF register.

14. The method of claim 10, further comprising:
    detecting, by the move-immediate logic circuit, a third move-immediate instruction comprising a third immediate value and a third destination register;
    determining that no FIT entry in the FIT corresponds to the third immediate value; and
    responsive to determining that no FIT entry in the FIT corresponds to the third immediate value:
      reclaiming an existing FIT entry of the plurality of FIT entries of the FIT according to a FIT replacement policy; and
      storing the third immediate value in the existing FIT entry of the plurality of FIT entries of the FIT.

15. The method of claim 14, wherein the FIT replacement policy comprises reclaiming an existing FIT entry of the plurality of FIT entries of the FIT having a lowest count value.

16. The method of claim 14, wherein the replacement policy comprises reclaiming a least-recently-used existing FIT entry of the plurality of FIT entries of the FIT.

17. The method of claim 10, further comprising:
    detecting, using the move-immediate logic circuit, a fourth move-immediate instruction comprising a fourth immediate value and a fourth destination register;
    determining that a fourth FIT entry of the plurality of FIT entries of the FIT corresponds to the fourth immediate value;
    responsive to determining that the fourth FIT entry in the FIT corresponds to the fourth immediate value, determining that the fourth FIT entry does not contain a valid IPRF tag corresponding to an IPRF register of the IPRF; and
    responsive to determining that the fourth FIT entry does not contain a valid IPRF tag corresponding to the IPRF register of the IPRF:
      allocating a fourth IPRF register of the plurality of IPRF registers of the IPRF;
      writing a fourth IPRF tag for the fourth IPRF register into the fourth FIT entry; and
      writing the fourth immediate value into the fourth IPRF register.

18. The method of claim 17, further comprising determining that a count value of the fourth FIT entry exceeds a FIT threshold;
    wherein allocating the fourth IPRF register, writing the fourth IPRF tag for the fourth IPRF register into the fourth FIT entry, and writing the fourth immediate value into the fourth IPRF register is responsive to determining that the count value of the fourth FIT entry exceeds the FIT threshold.

19. The method of claim 10, further comprising:
    detecting, using the move-immediate logic circuit, a fifth move-immediate instruction comprising a fifth immediate value and a fifth destination register;
    determining that a fifth FIT entry of the plurality of FIT entries of the FIT corresponds to the fifth immediate value;

responsive to determining that the fifth FIT entry in the FIT corresponds to the fifth immediate value, determining that the fifth FIT entry does not contain a valid IPRF tag corresponding to an IPRF register of the IPRF;

responsive to determining that the fifth FIT entry does not contain a valid IPRF tag corresponding to an IPRF register of the IPRF, determining that a count value of the fifth FIT entry does not exceed a FIT threshold; and responsive to determining that the count value of the fifth FIT entry does not exceed the FIT threshold, increment the count value of the fifth FIT entry.

20. A non-transitory computer-readable medium having stored thereon computer-executable instructions which, when executed by a processor, cause the processor to:

detect a move-immediate instruction comprising an immediate value and a destination register;

determine whether a frequent immediate table (FIT) entry of a plurality of FIT entries of a FIT corresponds to the immediate value;

responsive to determining that the FIT entry in the FIT corresponds to the immediate value, determine whether the FIT entry contains a valid immediate physical register file (IPRF) tag corresponding to an IPRF register of a plurality of IPRF registers of an IPRF; and responsive to determining that the FIT entry contains a valid IPRF tag corresponding to an IPRF register of the IPRF, write the IPRF tag of the IPRF register into a most-recent mapping table (MRT) entry of a plurality of MRT entries of a MRT corresponding to the destination register.

\* \* \* \* \*